(12) United States Patent
Ma et al.

(10) Patent No.: US 12,680,011 B2
(45) Date of Patent: Jul. 14, 2026

(54) COMPOSITIONS CONTAINING THERMALLY CONDUCTIVE FILLERS

(71) Applicant: PPG Industries Ohio, Inc., Cleveland, OH (US)

(72) Inventors: Liang Ma, Allison Park, PA (US); Marvin M. Pollum, Jr., Pittsburgh, PA (US); Calum H. Munro, Gibsonia, PA (US); Maria S. French, Berkshire (GB); Allison G. Condie, Valencia, PA (US); Fabien Mezzanotti, Montesson (FR); Josiane Léon, Thiers sur Thève (FR); Hong Li, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 626 days.

(21) Appl. No.: 17/996,169

(22) PCT Filed: Jan. 20, 2021

(86) PCT No.: PCT/US2021/014085
§ 371 (c)(1),
(2) Date: Oct. 13, 2022

(87) PCT Pub. No.: WO2021/211183
PCT Pub. Date: Oct. 21, 2021

(65) Prior Publication Data
US 2023/0193106 A1     Jun. 22, 2023

Related U.S. Application Data

(63) Continuation of application No. PCT/US2020/042099, filed on Jul. 15, 2020.

(60) Provisional application No. 63/010,448, filed on Apr. 15, 2020.

(51) Int. Cl.
| | |
|---|---|
| *H01M 10/50* | (2006.01) |
| *C08K 13/02* | (2006.01) |
| *C08L 23/22* | (2006.01) |
| *C09D 5/18* | (2006.01) |
| *C09D 7/45* | (2018.01) |
| *C09D 7/61* | (2018.01) |
| *C09D 7/63* | (2018.01) |
| *C09D 123/22* | (2006.01) |
| *C09K 5/14* | (2006.01) |
| *H01M 10/653* | (2014.01) |
| *C08K 3/22* | (2006.01) |
| *C08K 3/34* | (2006.01) |
| *C08K 5/11* | (2006.01) |

(52) U.S. Cl.
CPC ................ *C09K 5/14* (2013.01); *C08K 13/02* (2013.01); *C08L 23/22* (2013.01); *C09D 5/18* (2013.01); *C09D 7/45* (2018.01); *C09D 7/61* (2018.01); *C09D 7/63* (2018.01); *C09D*

*123/22* (2013.01); *H01M 10/653* (2015.04); *C08K 2003/222* (2013.01); *C08K 2003/2227* (2013.01); *C08K 2003/2296* (2013.01); *C08K 3/346* (2013.01); *C08K 5/11* (2013.01)

(58) Field of Classification Search
CPC ......... H01M 10/653; C09K 5/14; C09D 7/61; C09D 7/45; C09D 7/63; C09D 5/18; C09D 123/22; C08K 13/02; C08K 3/346; C08K 5/11; C08K 2003/222; C08K 2003/2227; C08K 2003/2296; C08L 23/22
See application file for complete search history.

(56) References Cited

U.S. PATENT DOCUMENTS

| | | | |
|---|---|---|---|
| 4,793,867 A | 12/1988 | Charles et al. |
| 5,077,325 A | 12/1991 | Akutagawa et al. |
| 5,588,989 A | 12/1996 | Vonk et al. |
| 6,294,249 B1 | 9/2001 | Hamer et al. |
| 7,749,368 B2 | 7/2010 | McMurdie et al. |
| 8,465,666 B2 | 6/2013 | Asahi et al. |
| 8,673,091 B2 | 3/2014 | McMillen et al. |
| 8,796,190 B2 | 8/2014 | Kato et al. |
| 8,901,256 B2 | 12/2014 | Pajel et al. |
| 9,425,373 B2 | 8/2016 | Aketa et al. |
| 9,540,550 B2 | 1/2017 | Wu et al. |
| 9,562,175 B2 | 2/2017 | Asay et al. |

(Continued)

FOREIGN PATENT DOCUMENTS

| | | |
|---|---|---|
| CN | 1467833 A | 1/2004 |
| CN | 1774475 A | 5/2006 |

(Continued)

OTHER PUBLICATIONS

"Boron nitride material properties from Accuratus", 2017. (Year: 2017).

(Continued)

*Primary Examiner* — Raymond Alejandro

(57)     ABSTRACT

The present invention is directed to a composition comprising a thermoplastic polymer and a thermally conductive filler package comprising thermally conductive, electrically insulative filler particles having a thermal conductivity of at least 5 W/m·K measured according to ASTM D7984) and a volume resistivity of at least 10 Ω·m (measured according to ASTM D257) and being present in an amount of at least 50% by volume based on total volume of the filler package. The present invention also is directed to coatings comprising a thermal conductivity of at least 0.5 W/m·K (measured according to ASTM D7984) and to substrates, at least a portion of which is coated with such a coating.

18 Claims, 4 Drawing Sheets

(56) References Cited

U.S. PATENT DOCUMENTS

| | | |
|---|---|---|
| 9,809,735 B2 | 11/2017 | Yoshihara et al. |
| 9,994,754 B2 | 6/2018 | Clough |
| 10,030,138 B2 | 7/2018 | Nonomura et al. |
| 10,280,348 B2 | 5/2019 | Virnelson |
| 10,689,551 B2 | 6/2020 | Butterbach et al. |
| 2002/0151642 A1 | 10/2002 | Nakagawa et al. |
| 2005/0006077 A1 | 1/2005 | Takata et al. |
| 2005/0155751 A1 | 7/2005 | Azuma et al. |
| 2006/0099338 A1 | 5/2006 | Boelz et al. |
| 2006/0254164 A1 | 11/2006 | Ueda et al. |
| 2007/0003721 A1 | 1/2007 | Ohta et al. |
| 2007/0241303 A1 | 10/2007 | Zhong et al. |
| 2008/0007890 A1 | 1/2008 | Harmon et al. |
| 2008/0241488 A1 | 10/2008 | Ohta et al. |
| 2009/0062449 A1 | 3/2009 | Wang |
| 2010/0012884 A1 | 1/2010 | Nakamichi et al. |
| 2011/0027565 A1 | 2/2011 | Matsumoto et al. |
| 2011/0159296 A1 | 6/2011 | Maenaka et al. |
| 2011/0259564 A1 | 10/2011 | Izutani et al. |
| 2011/0315916 A1 | 12/2011 | Wilson et al. |
| 2012/0022842 A1 | 1/2012 | Amadu |
| 2012/0217434 A1 | 8/2012 | Abee et al. |
| 2012/0228542 A1 | 9/2012 | l'Abee et al. |
| 2014/0234560 A1 | 8/2014 | Miyata et al. |
| 2015/0125646 A1 | 5/2015 | Tournilhac et al. |
| 2015/0140411 A1 | 5/2015 | Li et al. |
| 2015/0232718 A1 | 8/2015 | Wu et al. |
| 2015/0351217 A1 | 12/2015 | Koukami et al. |
| 2016/0032166 A1 | 2/2016 | Zhang et al. |
| 2016/0118316 A1 | 4/2016 | Aramaki et al. |
| 2016/0145411 A1 | 5/2016 | Uibel et al. |
| 2016/0312097 A1 | 10/2016 | Kitada et al. |
| 2017/0040570 A1 | 2/2017 | Kim et al. |
| 2017/0081579 A1 | 3/2017 | Fujikawa et al. |
| 2017/0335160 A1 | 11/2017 | Yamazaki et al. |
| 2017/0362473 A1 | 12/2017 | Butterbach et al. |
| 2018/0044191 A1 | 2/2018 | Song et al. |
| 2018/0094171 A1 | 4/2018 | Briers et al. |
| 2018/0194982 A1 | 7/2018 | Ezaki et al. |
| 2018/0208762 A1 | 7/2018 | Pomestchenko et al. |
| 2018/0208820 A1 | 7/2018 | Tsuda et al. |
| 2018/0230290 A1* | 8/2018 | Saga ........................ C08L 65/00 |
| 2018/0244578 A1 | 8/2018 | Nishio et al. |
| 2018/0265751 A1 | 9/2018 | Babilo et al. |
| 2018/0362822 A1 | 12/2018 | Eichler et al. |
| 2019/0040183 A1 | 2/2019 | Yoshida et al. |
| 2019/0309205 A1 | 10/2019 | Guo et al. |
| 2019/0345332 A1 | 11/2019 | Shimada et al. |
| 2020/0216324 A1 | 7/2020 | Song et al. |
| 2020/0231794 A1 | 7/2020 | Treat et al. |
| 2020/0317971 A1 | 10/2020 | Zoeller et al. |
| 2021/0395483 A1 | 12/2021 | Ma et al. |
| 2022/0267563 A1 | 8/2022 | Mezzanotti et al. |
| 2023/0019038 A1 | 1/2023 | Ma et al. |
| 2023/0183445 A1 | 6/2023 | Ma et al. |
| 2023/0212435 A1 | 7/2023 | Ma et al. |
| 2023/0220219 A1 | 7/2023 | Ma et al. |

FOREIGN PATENT DOCUMENTS

| | | |
|---|---|---|
| CN | 1798818 A | 7/2006 |
| CN | 102260413 A | 11/2011 |
| CN | 104629187 A | 5/2015 |
| CN | 104789175 A | 7/2015 |
| CN | 107987533 A | 5/2018 |
| CN | 109666434 A | 4/2019 |
| CN | 111286081 A | 6/2020 |
| CN | 114127176 B | 2/2024 |
| DE | 10259549 A1 | 7/2004 |
| EP | 2177570 A1 | 4/2010 |
| EP | 2942193 B1 | 10/2018 |
| EP | 3064560 B1 | 5/2022 |
| JP | 2008-169265 A | 7/2008 |
| JP | 4495772 B1 | 7/2010 |
| JP | 2012-219251 A | 11/2012 |
| KR | 10-2014-0019357 A | 2/2014 |
| KR | 10-2019-0010878 A | 1/2019 |
| TW | 201337968 A | 9/2013 |
| WO | 2011/125636 A1 | 10/2011 |
| WO | 2012114309 A1 | 8/2012 |
| WO | 2012114310 A1 | 8/2012 |
| WO | 2013/177850 A1 | 12/2013 |
| WO | 2014202649 A1 | 12/2014 |
| WO | 2015/067569 A1 | 5/2015 |
| WO | 2016139221 A1 | 9/2016 |
| WO | 2016198425 A1 | 12/2016 |
| WO | 2017106066 A1 | 6/2017 |
| WO | 2018/030079 A1 | 2/2018 |
| WO | 2018/178940 A1 | 10/2018 |
| WO | 2018/180470 A1 | 10/2018 |
| WO | 2019/220291 A1 | 11/2019 |
| WO | 2020000228 A1 | 1/2020 |
| WO | 2020077333 A1 | 4/2020 |
| WO | 2021011628 A1 | 1/2021 |
| WO | 2021119419 A1 | 6/2021 |
| WO | 2021211184 A1 | 10/2021 |
| WO | 2021211694 A1 | 10/2021 |
| WO | 2021211722 A1 | 10/2021 |
| WO | 2023102525 A1 | 6/2023 |
| WO | 2023240057 A1 | 12/2023 |
| WO | 2024044576 A1 | 2/2024 |

OTHER PUBLICATIONS

"Butyl acetate property from Chemical Book", 2018. (Year: 2018).
"DISPERBYK-111 technical data sheet", 2021. (Year: 2021).
"Polyamide property from Azo Materials", 2001. (Year: 2001).
International Search Report and Written Opinion received for PCT Application Serial No. PCT/US2021/014085 dated Apr. 15, 2021, 10 pages.
International Search Report and Written Opinion received for PCT Application Serial No. PCT/US2020/042099 dated Sep. 25, 2020, 9 pages.
"Aluminum hydroxide from Sigma Aldrich", 2026. (Year: 2026).
"Density of Polymers (by density)—scipoly.com", 2026. (Year: 2026).
"Stearic acid from Sigma Aldrich", 2026. (Year: 2026).
Milke, James, et al., FEMA 403 report, Federal Emergency Management Agency, World Trade Center Building Performance Study, "Appendix A: Overview of Fire Protection in Buildings", pages A-1 through A-28, May 2002.
Conley, Robert F., Practical Dispersion, A Guide to Understanding and Formulating Slurries, Chapter I the Dispersed State, Its Form and Formation, pp. 1-14, 1996.
Dearmitt, Chris, et al., Applied Plastics Engineering Handbook, Processing, Materials, and Applications, Second Edition, Chapter 22 Dispersants and Coupling Agents, pp. 501-516, 2017.
Wypych, George, Handbook of Fillers, 5th Edition, Chapter 13 Influence of Fillers on Performance of Other Additives and Vice Versa, pp. 699-725, 2021.

* cited by examiner

COMPOSITIONS CONTAINING THERMALLY CONDUCTIVE FILLERS

CROSS-REFERENCE TO RELATED APPLICATION

This application claims the benefit U.S. Provisional Application No. 63/010,448, filed on Apr. 15, 2020 and entitled "Compositions Containing Thermally Conductive Fillers," and PCT Application No. PCT/US2020/042099, filed on Jul. 15, 2020, and entitled "Compositions Containing Thermally Conductive Fillers," each incorporated herein by reference in its entirety.

FIELD OF THE INVENTION

The present invention relates to compositions containing a thermally conductive filler component, for example sealant compositions, adhesive compositions, 3D-printable compositions, and coating compositions.

BACKGROUND OF THE INVENTION

Coating compositions, including sealants and adhesives, are utilized in a wide variety of applications to treat a variety of substrates or to bond together two or more substrate materials.

SUMMARY OF THE INVENTION

The present invention is directed to compositions comprising: a thermoplastic polymer; and a thermally conductive filler package comprising thermally conductive, electrically insulative filler particles having a thermal conductivity of at least 5 W/M·K (measured according to ASTM D7984) and a volume resistivity of at least 10 Ω·m (measured according to ASTM D257) and being present in an amount of at least 50% by volume based on total volume of the filler package.

The present invention also is directed to compositions comprising: a thermoplastic polymer; and a thermally conductive filler package comprising thermally conductive, electrically insulative filler particles having a thermal conductivity of at least 5 W/m·K (measured according to ASTM D7984) and a volume resistivity of at least 10 Ω·m (measured according to ASTM D257) and being present in an amount of at least 50% by volume based on total volume of the filler package; wherein at least a portion of the thermally conductive, electrically insulative filler particles comprise thermally stable filler particles.

The present invention also is directed to compositions comprising: a thermoplastic polymer; and a thermally conductive filler package comprising thermally conductive, electrically insulative filler particles having a thermal conductivity of at least 5 W/M·K (measured according to ASTM D7984) and a volume resistivity of at least 10 Ω·m (measured according to ASTM D257) and being present in an amount of at least 50% by volume based on total volume of the filler package; wherein at least a portion of the thermally conductive, electrically insulative filler particles comprise thermally unstable filler particles.

The present invention also is directed to a method of treating a substrate comprising contacting at least a portion of a surface of the substrate with a composition of the present invention.

The present invention also is directed to a coating formed on a surface of a substrate, wherein the coating, in an at least partially cured state, has a thermal conductivity of at least 0.5 W/M·K (measured according to ASTM D7984), has a leakage current of less than 0.5 mA/mm$^2$ (measured according to IEC 60243), maintains a temperature of the substrate that is at least 100° C. lower following exposure of the coating on the surface of the substrate to 1000° C. for a time of at least 90 seconds than a surface temperature of a bare substrate exposed to 1000° C. for the time, and/or does not smoke upon exposure of the substrate to 1000° C. for 500 seconds.

The present invention also is directed to a battery assembly comprising: a battery cell; and a coating formed on a surface of the battery cell from a composition of the present invention.

The present invention also is directed to a substrate comprising a surface at least partially coated with a layer formed from a composition of the present invention.

The present invention also is directed to a method of forming an article comprising extruding a composition of the present invention.

The present invention also is directed to a use of a composition of the present invention for making a coating that, in an at least partially cured state, has a thermal conductivity of at least 0.5 W/M·K (measured according to ASTM D7984), has a leakage current of less than 0.5 mA/mm$^2$ (measured according to IEC 60243), maintains a temperature of the substrate that is at least 100° C. lower following exposure of the coating on the surface of the substrate to 1000° C. for a time of at least 90 seconds than a surface temperature of a bare substrate exposed to 1000° C. for the time, and/or does not smoke upon exposure of the substrate to 1000° C. for 500 seconds.

The present invention also is directed to a use of a coating formed from a composition of the present invention to provide a substrate with thermal and fire protection.

DETAILED DESCRIPTION OF THE INVENTION

Figure 1:
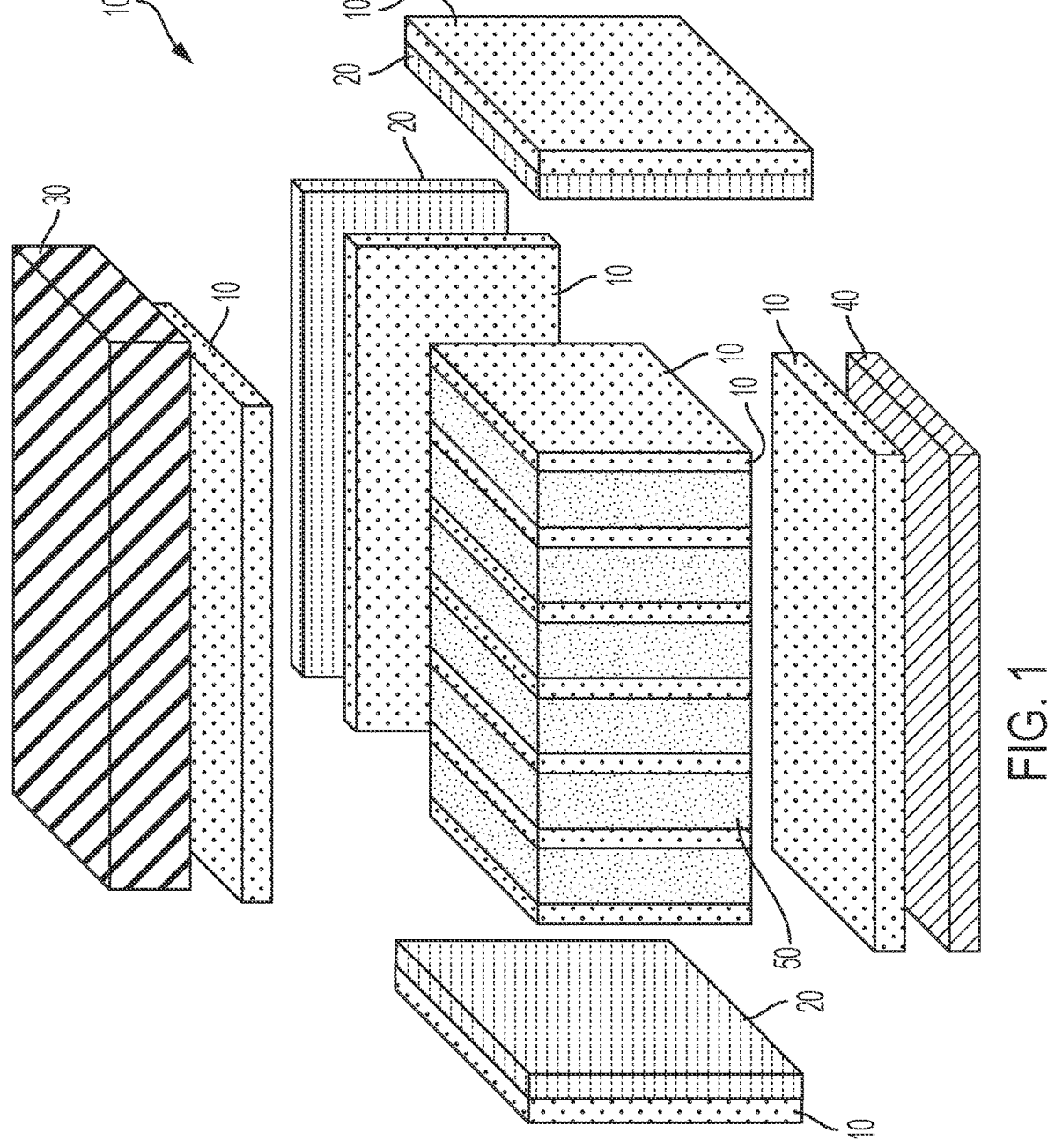
FIGS. 1 and 2 are schematic perspective views illustrating a thermally conductive member utilized in a battery pack.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described. As used herein, open-ended terms include closed terms such as "consisting essentially" of and "consisting of".

In this application, the use of the singular includes the plural and plural encompasses singular, unless specifically stated otherwise. For example, although reference is made herein to "a" thermoplastic polymer or "a" filler material, a combination (i.e., a plurality) of these components may be used.

In addition, in this application, the use of "or" means "and/or" unless specifically stated otherwise, even though "and/or" may be explicitly used in certain instances.

As used herein, the terms "on," "onto," "applied on," "applied onto," "formed on," "deposited on," "deposited onto," and the like mean formed, overlaid, deposited, or provided on, but not necessarily in contact with, a substrate surface. For example, a composition "applied onto" a substrate surface does not preclude the presence of one or more other intervening coating layers or films of the same or different composition located between the composition and the substrate surface.

As used herein, a "coating composition" refers to a composition, e.g., a mixture or a dispersion, that is capable of producing a film, layer, or the like on at least a portion of a substrate surface.

As used herein, a "sealant composition" refers to a coating composition, e.g., a mixture or a dispersion, that has the ability to resist atmospheric conditions such as moisture and temperature gradients and particulate matter, such as moisture and temperature and at least partially block the transmission of materials, such as particulates, water, fuel, and/or other liquids and gasses.

As used herein, a "gap filler composition" refers to a coating composition, e.g., a mixture or a dispersion, that fills a gap between thermal transfer surfaces in order to increase thermal transfer efficiency as compared to having the gap filled with air.

As used herein, an "adhesive composition" refers to a coating composition, e.g., a mixture or a dispersion, that forms a bond with a substrate when pressure is applied to the composition. Once applied, the composition resists flow.

The initial bond strength upon contact can be measured as tack according to ASTM D-3121.

As used herein, the term "thermoplastic" refers to a component that can soften upon heating and solidify upon cooling and does not need to react with other components of a composition in order to function but that is present as a blended ingredient, i.e., does not form a thermoset material.

As used herein, the term "thermoplastic elastomer" refers to a class of polymers that can be stretched repeatedly to at least twice their original length at room temperature, e.g. at 23° C., with an ability to return to their approximate original length when the stress is released. In addition, these polymers can be softened or melted when heated and hardened when cooled.

As used herein, the term "one component" or "1K" refers to a composition in which all of the ingredients may be premixed and stored and do not readily react at ambient or slightly thermal conditions (i.e., greater than ambient to 70° C.) and remain "workable" for at least 10 days after mixing. As further defined herein, ambient conditions generally refer to room temperature and humidity conditions or temperature and humidity conditions that are typically found in the area in which the composition is applied to a substrate, e.g., at 20° C. to 40° C. and 20% to 80% relative humidity, while slightly thermal conditions are temperatures that are slightly above ambient temperature. As used herein, the term "workable" means that the composition is of a viscosity that it is able to be deformed and/or shaped under manual pressure and may have a viscosity less than such viscosity.

As used herein, the term "thermally conductive filler" or "TC filler" means a pigment, filler, or inorganic powder that has a thermal conductivity of at least 5 W/m·K at 25° C. (measured according to ASTM D7984).

As used herein, the term "non-thermally conductive filler" or "NTC filler" means a pigment, filler, or inorganic powder that has a thermal conductivity of less than 5 W/M·K at 25° C. (measured according to ASTM D7984).

As used herein, the term "electrically insulative filler" or "EI filler" means a pigment, filler, or inorganic powder that has a volume resistivity of at least 1 Ω·m (measured according to ASTM D257).

As used herein, the term "electrically conductive filler" or "EC filler" means a pigment, filler, or inorganic powder that has a volume resistivity of less than 1 Ω·m (measured according to ASTM D257).

As used herein, the term "thermally conductive filler package" means a plurality of filler particles comprising at least one type of thermally conductive, electrically insulative filler particles and optionally at least one type of thermally conductive, electrically conductive filler particles and/or at least one type of non-thermally conductive, electrically insulative filler particles. For clarity, the term "filler package" excludes any ingredients that are not TC/EI filler particles, TC/EC filler particles, and/or NTC/EI filler particles.

As used herein, the term "thermally stable" means a pigment, filler, or inorganic powder that, when tested using the thermal gravimetric analysis (TGA) test under air (according to ASTM E1131), has no more than 5% weight loss of the total weight of the pigment, filler, or powder occurring before 600° C.

As used herein, the term "thermally unstable" means a pigment, filler, or inorganic powder that, when tested using the TGA test under air (according to ASTM E1131), has a weight loss of the total weight of the pigment of more than 5% occurring before 600° C.

As used herein, the term "smoke" means a suspension of airborne particles and/or gasses, visible to the naked eye, that are emitted when a material undergoes combustion.

As used herein, the term "combustion" refers to the rapid oxidation of materials resulting from exposure to heat or flame.

As used herein, the term "solvent" refers to a molecule or a compound that has a high vapor pressure such as greater than 2 mm Hg at 25° C. determined by differential scanning calorimetry according to ASTM E1782 and is used to lower the viscosity of a resin but that does not have a reactive functional group capable of reacting with a functional group (s) on molecules or compounds in a composition.

As used herein, the term "plasticizer" refers to a molecule or a compound that has a low vapor pressure such as no greater than 2 mm Hg at 25° C. determined by differential scanning calorimetry according to ASTM E1782 and does not have a functional group capable of reacting with a functional group(s) on molecules or compounds in a composition and that is added to the composition to decrease viscosity, decrease glass transition temperature (Tg), and impart flexibility.

As used herein, the volume percentage of each ingredient is calculated using the below equation:

$$\text{Vol \% (ingredient)} = (\text{volume of ingredient/total volume of composition}) \times 100\%,$$

where the volume of ingredient=(mass of ingredient/true density of ingredient).

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

Compositions of the Present Invention

The present invention is directed to a one-component composition comprising, or consisting essentially of, or consisting of, a thermoplastic polymer; and a thermally conductive filler package comprising thermally conductive, electrically insulative filler particles having a thermal conductivity of at least 5 W/M·K (measured according to ASTM D7984) and a volume resistivity of at least 10 Ω·m (measured according to ASTM D257) and being present in an amount of at least 50% by volume based on total volume of the filler package. As described in more detail below, the filler package optionally may further comprise at least one thermally stable filler material and/or at least one thermally unstable material. As used herein, the composition "consists essentially of" a thermoplastic polymer and a thermally conductive filler package means that the thermal conductivity and the leakage current of the coating composition is achieved by the thermoplastic polymer and the thermally conductive filler package, and that any other ingredients present in the composition do not materially affect these properties.

The composition may be a one-component coating composition, such as a sealant composition, an adhesive composition, a gap filling composition, a putty, a molding compound, a potting compound, and/or a 3D-printable composition or may be used to form a film, layer, or the like, or a part, such as a casted, molded, extruded, or machined part.

Thermoplastic Polymer

As stated above, the composition comprises a thermoplastic polymer. The thermoplastic polymer may be a homopolymer or a copolymer, such as a block copolymer, a random copolymer, a terpolymer, or combinations thereof. The thermoplastic may be a thermoplastic elastomer. The thermoplastic polymer optionally may be synthetic or natural. Suitable thermoplastic polymers useful in the present invention include polyamides, such as nylon and aramid; polyolefins, such as polybutadiene, polyisobutylene, polybutene, polymethylpentene, amorphous polypropylene, polyethylene terephthalate, polyethylene, polystyrene, ethylene propylene copolymer, polyvinyl chloride, and vinyl chloride copolymer; polyurethanes; styrene block copolymers, such as styrene-butadiene, styrene-isoprene, styrene-butadiene-styrene, styrene-isoprene-styrene, styrene-ethylene/butylene-styrene, styrene-ethylene/propylene; polyethers such as polyethylene oxide, polypropylene oxide, polyoxymethylene, poly(p-phenylene ether); ethylene-vinylacetate; polybenzimidazole; polyphenylene sulfide; polyether sulfone; polyether ether ketone; chloroprene; acrylonitrile butadiene; polycarbonate; polyacrylates such as poly(meth)acrylate; or combinations thereof. In examples, useful non-reactive elastomers include Polyvest® polybutadiene available from Evonik. Examples of reactive elastomers include Hypro® ATBN amine-functional butadiene copolymer available from Emerald Performance Materials. As used herein, the term "block copolymer" refers to a copolymer formed when the two monomers cluster together and form blocks of repeating units. As used herein, the term "random copolymer" refers to a copolymer comprised of more than one kind of repeating unit, in which there is a random distribution of repeating units. As used herein, the term "terpolymer" refers to a polymer that results from copolymerization of three discrete monomers. As used herein, a "thermoplastic elastomer" refers to a copolymer having both thermoplastic and elastomeric properties. Suitable examples of thermoplastic elastomers include olefinic thermoplastic elastomers, polyether block amides polybutadiene thermoplastics elastomer, polyester thermoplastic elastomer, styrenic thermoplastic elastomer, and vinyl thermoplastic elastomers, and rubbers such as butadiene rubber, butyl rubber, bromobutyl rubber, chlorobutyl rubber, polyisobutylene rubber, chlorosuflonated polyethylene rubber, epichlorohydrin rubber, ethylene-propylene rubber, fluoroelastomer (vinylidene fluoride-hexafluoropropylene copolymer), natural rubber, neoprene rubber, nitrile rubber, polysulfide rubber, polyurethane rubber, silicone rubber, styrene-butadiene rubber.

Optionally, the thermoplastic polymer may be substantially free, or essentially free, or completely free, of polyester. As used herein with respect to the absence of polyester in the thermoplastic polymer, "substantially free" means that polyester is present, if at all, in an amount of less than 3% by volume based on total volume of the composition. As used herein with respect to the absence of polyester in the thermoplastic polymer, "essentially free" means that polyester is present, if at all, in an amount of less than 1% by volume based on total volume of the composition. As used herein with respect to the absence of polyester in the thermoplastic polymer, "completely free" means that polyester is present, if at all, in an amount of less than 0.1% by volume based on total volume of the composition.

Optionally, the thermoplastic polymer may be substantially free, or essentially free, or completely free, of silicone. As used herein with respect to the absence of silicone in the thermoplastic polymer, "substantially free" means that silicone is present, if at all, in an amount of less than 3% by volume based on total volume of the composition. As used herein with respect to the absence of silicone in the thermoplastic polymer, "essentially free" means that silicone is present, if at all, in an amount of less than 1% by volume based on total volume of the composition. As used herein with respect to the absence of silicone in the thermoplastic polymer, "completely free" means that silicone is present, if at all, in an amount of less than 0.1% by weight based on total volume of the composition.

The thermoplastic polymer may be substantially free or completely free, of reactive functional groups, that is, functional groups that react with other functional groups in the composition. As used herein, the term "substantially free" with respect to the presence of a reactive functional group on the thermoplastic polymer means that less than one reactive functional group is present on the thermoplastic polymer. As used herein, the term "completely free" with respect to the presence of a reactive functional group means that there are 0 reactive functional groups present on the thermoplastic polymer.

The thermoplastic polymer may be present in the composition in an amount of at least 1% by volume based on total volume of the composition, such as at least 10% by volume, such as at least 20% by volume, such as at least 30% by volume, and may be present in the composition in an amount of no more than 80% by volume based on total volume of the composition, such as no more than 70% by volume, such as no more than 60% by volume, such as no more than 40% by volume. The thermoplastic polymer may be present in the composition in an amount of 1% by volume to 80% by volume based on total volume of the composition, such as 10% by volume to 70% by volume, such as 20% by volume to 60% by volume, such as 30% by volume to 40% by volume.

Thermally Conductive Filler Package

The present invention also may comprise a thermally conductive filler package comprising particles of a thermally conductive, electrically insulative filler material (referred to herein as "TC/EI filler material" and described in more detail below). The TC/EI filler material may comprise organic or inorganic material and may comprise particles of a single type of filler material or may comprise particles of two or more types of TC/EI filler materials. That is, the thermally conductive filler package may comprise particles of a first TC/EI filler material and may further comprise particles of at least a second (i.e., a second, a third, a fourth, etc.) TC/EI filler material that is different from the first TC/EI filler material. In an example, the particles of the first TC/EI filler material may have an average particle size that is at least one order of magnitude greater than an average particle size of the particles of the second TC/EI filler material, such as at least two orders of magnitude greater, such as at least three orders of magnitude greater, wherein the particle sizes may be measured by methods known to those skilled in the art, for example, using a scanning electron microscope (SEM). For example, powders may be dispersed on segments of carbon tape attached to aluminum stubs and coated with Au/Pd for 20 seconds. Samples then may be analyzed in a Quanta 250 FEG SEM under high vacuum (accelerating voltage 10 kV and spot size 3.0), measuring 30 particles from three different areas to provide an average particle size for each sample. One skilled in the art will recognize that there can be variations in this procedure that retain the essential elements of microscopic imaging and averaging of representative size. As used herein with respect to types of filler material, reference to "first," "second", etc. is for convenience only and does not refer to order of addition to the filler package or the like.

Optionally, as discussed in more detail below, the filler package also may comprise particles of thermally conductive, electrically conductive filler material (referred to herein as "TC/EC" filler material) and/or particles of non-thermally conductive, electrically insulative filler material (referred to herein as "NTC/EI" filler material). The filler materials may be organic or inorganic.

The TC/EC filler material may comprise particles of a single type of filler material or may comprise particles of two or more types of TC/EC filler materials. That is, the thermally conductive filler package may comprise particles of a first TC/EC filler material and may further comprise particles of at least a second (i.e., a second, a third, a fourth, etc.) TC/EC filler material that is different from the first TC/EC filler material. In an example, the particles of the first TC/EC filler material may have an average particle size that is at least one order of magnitude greater than an average particle size of the particles of the second TC/EC filler material, such as at least two orders of magnitude greater, such as at least three orders of magnitude greater, wherein the particle sizes may be measured, for example, using an SEM as described above.

Likewise, the NTC/EI filler material may comprise particles of a single type of filler material or may comprise particles of two or more types of NTC/EI filler materials. That is, the thermally conductive filler package may comprise particles of a first NTC/EI filler material and may further comprise particles of at least a second (i.e., a second, a third, a fourth, etc.) NTC/EI filler material that is different from the first NTC/EI filler material. In an example, the particles of the first NTC/EI filler material may have an average particle size that is at least one order of magnitude greater than an average particle size of the particles of the second NTC/EI filler material, such as at least two orders of magnitude greater, such as at least three orders of magnitude greater, wherein the particle sizes may be measured, for example, using an SEM as described above.

Particles of filler used in the thermally conductive filler package may have a reported Mohs hardness of at least 1 (based on the Mohs Hardness Scale), measured according to ASTM D2240, such as at least 2, such as at least 3, and may have a reported Mohs hardness of no more than 10, such as no more than 8, such as no more than 7. Particles of filler used in the thermally conductive filler package may have a reported Mohs hardness of 1 to 10, such as 2 to 8, such as 3 to 7.

Particles of filler material used in the thermally conductive filler package may have a reported average particle size in at least one dimension of at least 0.01 μm, as reported by the manufacturer, such as at least 2 μm, such as at least 10 μm, and may have a reported average particle size in at least one dimension of no more than 500 μm as reported by the manufacturer, such as no more than 400 μm, such as no more than 300 μm, such as no more than 100 μm. The particles of filler material used in the thermally conductive filler package may have a reported average particle size in at least one dimension of 0.01 μm to 500 μm as reported by the manufacturer, such as 0.1 μm to 400 μm, such as 2 μm to 300 μm, such as 10 μm to 100 μm. Suitable methods of measuring average particle size include measurement using an instrument such as a Quanta 250 FEG SEM or an equivalent instrument.

Particles of filler material used in the thermally conductive filler package may comprise a plurality of particles each having, for example, a platy, spherical, or acicular shape, and agglomerates thereof. As used herein, "platy" refers to a two-dimensional material having a substantially flat surface and that has a thickness in one direction that is less than 25% of the largest dimension.

Particles of filler material used in the thermally conductive filler package may be thermally conductive. The particles of thermally conductive filler material may have a thermal conductivity of at least 5 W/m·K at 25° C. (measured according to ASTM D7984), such as at least 18 W/m·K, such as at least 55 W/m·K, and may have a thermal conductivity of no more than 3,000 W/m·K at 25° C., such as no more than 1,400 W/m·K, such as no more than 450 W/m·K. The particles of a thermally conductive filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K.

Particles of filler material used in the thermally conductive filler package may be non-thermally conductive. The particles of non-thermally conductive filler material may have a thermal conductivity of less than 5 W/m·K at 25° C. (measured according to ASTM D7984), such as no more than 3 W/m·K, such as no more than 1 W/m·K, such as no more than 0.1 W/m·K, such as no more than 0.05 W/m·K, such as 0.02 W/m·K at 25° C. to 5 W/m·K at 25° C. Thermal conductivity may be measured as described above.

Particles of filler material used in the thermally conductive filler package may be electrically insulative. The particles of electrically insulative filler material may have a volume resistivity of at least 1 Ω·m (measured according to ASTM D257), such as at least 10 Ω·m, such as at least 100 Ω·m.

Particles of filler material used in the thermally conductive filler package may be electrically conductive. The particles of electrically conductive filler material may have a volume resistivity of less than 1 Ω·m (measured according to ASTM D257), such as less than 0.1 Ω·m.

The filler package may be present in the composition in an amount of at least 20% by volume based on total volume of the composition, such as at least 30% by volume, such as at least 40% by volume, such as at least 50% by volume, and may be present in the composition in an amount of no more than 99% by volume based on total volume of the composition, such as no more than 90% by volume, such as no more than 80% by volume, such as no more than 70% by volume. The thermally conductive filler package may be present in the composition in an amount of 20% by volume to 99% by volume based on total volume of the composition, such as 30% by volume to 90% by volume, such as 40% by volume to 80% by volume, such as 50% by volume to 70% by volume.

As noted above, the thermally conductive filler package may comprise particles of TC/EI filler material.

Suitable TC/EI filler materials include boron nitride (for example, commercially available as CarboTherm from Saint-Gobain, as CoolFlow and PolarTherm from Momentive, and as hexagonal boron nitride powder available from Panadyne), silicon nitride, or aluminum nitride (for example, commercially available as aluminum nitride powder available from Micron Metals Inc., and as Toyalnite from Toyal), metal oxides such as aluminum oxide (for example, commercially available as Microgrit from Micro Abrasives, as Nabalox from Nabaltec, as Aeroxide from Evonik, and as Alodur from Imerys), magnesium oxide, beryllium oxide, silicon dioxide, titanium oxide, zinc oxide, nickel oxide, copper oxide, or tin oxide, metal hydroxides such as aluminum trihydrate, aluminum hydroxide or magnesium hydroxide, arsenides such as boron arsenide, carbides such as silicon carbide, minerals such as agate and emery, ceramics such as ceramic microspheres (for example, commercially available from Zeeospheres Ceramics or 3M), silicon carbide, and diamond. These fillers can also be surface modified, such as PYROKISUMA 5301K available from Kyowa Chemical Industry Co., Ltd. These thermally conductive fillers may be used alone or in a combination of two or more.

The TC/EI filler particles may be present in an amount of at least 50% by volume based on total volume of the filler package, such as at least 60% by volume, such as at least 70% by volume, such as at least 80% by volume, such as at least 90% by volume, and may be present in an amount of no more than 100% by volume based on total volume of the filler package, such as no more than 90% by volume, such as no more than 80% by volume. The TC/EI filler particles may be present in an amount of 50% by volume to 100% by volume based on total volume of the filler package, such as 60% by volume to 100% by volume, such as 70% by volume to 100% by volume, such as 80% by volume to 100% by volume, such as 90% by volume to 100% by volume, such as 50% by volume to 90% by volume, such as 60% by volume to 90% by volume, such as 70% by volume to 90% by volume, such as 80% by volume to 90% by volume, such as such as 50% by volume to 80% by volume, such as 60% by volume to 80% by volume, such as 70% by volume to 80% by volume, such as 50% by volume to 70% by volume, such as 50% by volume to 60% by volume, such as 60% by volume to 70% by volume.

The filler package may comprise thermally stable filler materials. In an example, at least a portion of the TC/EI filler particles may be thermally stable. For example, at least 0.1% by volume of the TC/EI filler particles may be thermally stable based on total volume of the TC/EI fillers present in the thermally conductive filler package, such as at least 1% by volume, such as at least 10% by volume such as at least 15% by volume, such as at least 20% by volume, such as at least 25% by volume, such as at least 30% by volume, such as at least 35% by volume, such as at least 40% by volume, such as at least 45% by volume, such as at least 50% by volume, such as at least 55% by volume, such as at least 60% by volume, such as at least 65% by volume, such as at least 70% by volume, such as least 75% by volume, such as at least 80% by volume, such as at least 85% by volume, such as at least 90% by volume, such as at least 91% by volume, such as at least 92% by volume, such as at least 93% by volume, such as at least 94% by volume, such as at least 95% by volume, such as at least 96% by volume, such as at least 97% by volume, such as at least 98% by volume, such as at least 99% by volume, such as 100% by volume. For example, 0.1% by volume to 100% by volume of the TC/EI filler particles may be thermally stable based on total volume of the TC/EI fillers present in the thermally conductive filler package, such as 1% by volume to 90% by volume, such as 10% by volume to 80% by volume, such as 20% by volume to 70% by volume, such as 30% by volume to 60% by volume, such as 90% by volume to 100% by volume, such as 93% by volume to 98% by volume.

In an example, the composition may comprise at least a portion of TC/EI filler particles that are thermally unstable. For example, at least 0.1% by volume of the TC/EI filler particles may be thermally unstable based on total volume of the TC/EI fillers present in the thermally conductive filler package, such as at least 1% by volume, such as at least 10% by volume such as at least 15% by volume, such as at least 20% by volume, such as at least 25% by volume, such as at least 30% by volume, such as at least 35% by volume, such as at least 40% by volume, such as at least 45% by volume, such as at least 50% by volume, such as at least 55% by volume, such as at least 60% by volume, such as at least 65% by volume, such as at least 70% by volume, such as least 75% by volume, such as at least 80% by volume, such as at least 85% by volume, such as at least 90% by volume, such as at least 91% by volume, such as at least 92% by volume, such as at least 93% by volume, such as at least 94% by volume, such as at least 95% by volume, such as at least 96% by volume, such as at least 97% by volume, such as at least 98% by volume, such as at least 99% by volume, such as 100% by volume. For example, 0.1% by volume to 100% by volume of the TC/EI filler particles may be thermally stable based on total volume of the TC/EI fillers present in the thermally conductive filler package, such as 1% by volume to 90% by volume, such as 10% by volume to 80% by volume, such as 20% by volume to 70% by volume, such as 30% by volume to 60% by volume, such as 90% by volume to 100% by volume, such as 93% by volume to 98% by volume. In other examples, no more than 10% by volume of the TC/EI filler particles may be thermally unstable based on total volume of the TC/EI fillers present in the thermally conductive filler package, such as no more than 9% by volume, such as no more than 8% by volume, such as no more than 7% by volume, such as no more than 6% by volume, such as no more than 5% by volume, such as no more than 4% by volume, such as no more than 3% by volume, such as no more than 2% by volume, such as no more than 1% by volume. For example, up to 10% by volume of the TC/EI filler particles may be thermally unstable based on total volume of the TC/EI fillers present in the thermally conductive filler package, such as 2% by volume to 7% by volume.

Suitable thermally stable TC/EI fillers include boron nitride, silicon nitride, or aluminum nitride, arsenides such as boron arsenide, metal oxides such as aluminum oxide, magnesium oxide, beryllium oxide, silicon dioxide, titanium oxide, zinc oxide, nickel oxide, copper oxide, or tin oxide, carbides such as silicon carbide, minerals such as agate and emery, ceramics such as ceramic microspheres, and diamond. The silica ($SiO_2$) may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, AEROSIL® R 972 commercially available from Evonik Industries and products sold under the trade name HDK® such as HDK® H17 and HDK® H18 commercially available from Wacker Chemie AG. These fillers can also be surface modified, such as PYROKISUMA 5301K available from Kyowa Chemical Industry Co., Ltd. These thermally stable, TC/EI fillers may be used alone or in a combination of two or more.

Suitable thermally unstable TC/EI filler materials include metal hydroxides such as aluminum trihydrate, aluminum hydroxide or magnesium hydroxide. These fillers can also be surface modified, such as Hymod®M9400 SF available from J.M. Huber Corporation. These thermally unstable, TC/EI fillers may be used alone or in a combination of two or more.

As noted above, the thermally conductive filler package may comprise particles of TC/EC filler material.

Suitable TC/EC filler materials include metals such as silver, zinc, copper, gold, or metal coated hollow particles, carbon compounds such as graphite (such as Timrex commercially available from Imerys or ThermoCarb commercially available from Asbury Carbons), carbon black (for example, commercially available as Vulcan from Cabot Corporation), carbon fibers (for example, commercially available as milled carbon fiber from Zoltek), graphene and graphenic carbon particles (for example, xGnP graphene nanoplatelets commercially available from XG Sciences, and/or for example, the graphene particles described below), carbonyl iron, copper (such as spheroidal powder commercially available from Sigma Aldrich), zinc (such as Ultrapure commercially available from Purity Zinc Metals and Zinc Dust XL and XLP available from US Zinc), and the like. Examples of "graphenic carbon particles" include carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference. As used herein, the term "substantially flat" means planar; "curved" or "curled" materials deviate from planarity by having a non-zero curvature; and "creased" or "buckled" indicates that at least a portion of the area is thicker than one sheet, such that the plane is doubled or folded upon itself.

The TC/EC filler particles, if present at all, may be present in an amount of no more than 50% by volume based on total volume of the filler package, such as no more than 40% by volume, such as no more than 30% by volume, such as no more than 20% by volume, such as no more than 10% by volume, and may be present in an amount of at least 0.1% by volume based on total volume of the filler package, such as at least 0.5% by volume, such as at least 1% by volume, such as at least 5% by volume, such as at least 10% by volume. The TC/EC filler particles may be present in an amount of 0.1% by volume to 50% by volume based on total volume of the filler package, such as 0.1% by volume to 40% by volume, such as 0.1% by volume to 30% by volume, such as 0.1% by volume to 20% by volume, such as 0.1% by volume to 10% by volume, such as 0.5% by volume to 50% by volume, such as 0.5% by volume to 40% by volume, such as 0.5% by volume to 30% by volume, such as 0.5% by volume to 20% by volume, such as 0.5% by volume to 10% by volume, such as 1% by volume to 50% by volume, such as 1% by volume to 40% by volume, such as 1% by volume to 30% by volume, such as 1% by volume to 20% by volume, such as 1% by volume to 10% by volume, such as 5% by volume to 50% by volume, such as 5% by volume to 40% by volume, such as 5% by volume to 30% by volume, such as 5% by volume to 20% by volume, such as 5% by volume to 10% by volume, such as 10% by volume to 50% by volume, such as 10% by volume to 40% by volume, such as 10% by volume to 30% by volume, such as 10% by volume to 20% by volume.

As noted above, the thermally conductive filler package may comprise particles of NTC/EI filler material.

Suitable NTC/EI filler materials include but are not limited to mica, wollastonite, calcium carbonate, glass microspheres, clay, or combinations thereof.

As used herein, the term "mica" generally refers to sheet silicate (phyllosilicate) minerals. The mica may comprise muscovite mica. Muscovite mica comprises a phyllosilicate mineral of aluminum and potassium with the formula $KAl_2(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

Wollastonite comprises a calcium inosilicate mineral ($CaSiO_3$) that may contain small amounts of iron, aluminum, magnesium, manganese, titanium and/or potassium. The wollastonite may have a B.E.T. surface area of 1.5 to 2.1 $m^2/g$, such as 1.8 $m^2/g$ and a median particle size of 6 microns to 10 $\Omega$·microns, such as 8 microns. Non-limiting examples of commercially available wollastonite include NYAD 400 available from NYCO Minerals, Inc.

The calcium carbonate ($CaCO_3$) may comprise a precipitated calcium carbonate or a ground calcium carbonate. The calcium carbonate may or may not be surface treated, such as treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

Useful clay minerals include a non-ionic platy filler such as talc, pyrophyllite, chlorite, vermiculite, or combinations thereof.

The glass microspheres may be hollow borosilicate glass. Non-limiting examples of commercially available glass microspheres include 3M Glass bubbles type VS, K series, and S series available from 3M.

The NTC/EI filler particles, if present at all, may be present in an amount of no more than 10% by volume based on total volume of the filler package, such as no more than 5% by volume, such as no more than 1% by volume, and may be present in an amount of at least 0.1% by volume based on total volume of the filler package, such as at least 0.5% by volume. The NTC/EI filler particles may be present in an amount of 0.1% by volume to 10% by volume based on total volume of the filler package, such as 0.5% by volume to 5% by volume, such as 0.5% by volume to 1% by volume.

Dispersants

The composition may further comprise a dispersant. As used herein, the term "dispersant" refers to a substance that may be added to the composition in order to improve the wettability of the particles, reduce surface tension between two phases, and/or improve separation and/or stabilization of the thermally conductive filler particles.

Useful dispersants may be anionic, cationic, amphoteric, or nonionic. Suitable dispersants for use in the composition include fatty acid, phosphoric acid esters, polyurethanes, polyamines, polyacrylates, polyalkoxylates, sulfonates, polyethers, and polyesters, or any combination thereof. Non-limiting examples of commercially available dispersants include ANTI-TERRA-U100, DISPERBYK-102, DISPERBYK-103, DISPERBYK-111, DISPERBYK-171, DISPERBYK-2151, DISPERBYK-2059, DISPERBYK-2000, DISPERBYK-2117, and DISPERBYK-2118 available from BYK Company; and SOLSPERSE 24000SC, SOLSPERSE 16000 and SOLSPERSE 8000 hyperdispersants available from The Lubrizol Corporation. Other suitable dispersants include Triton™ X-100, nonoxynol-9, polysorbate, Span®, poloxamers, Tergitol™, Antarox®, PENTEX® 99, PFOS, Calsoft®, Texapon®, Darvan®, cetyl trimethylammonium bromide (CTAB) and cetyl trimethylammonium chloride (CTAC), cetylpyridinium chloride (CPC), benzethonium chloride (BZT).

The dispersant, if present at all, may be present in the composition in an amount of no more than 20% by volume based on total volume of the composition, such as no more than 10% by volume, and may be present, if at all, in the composition in an amount of at least 0.05% by volume based on total volume of the composition, such as at least 0.2% by volume, such as at least 1% by volume. The dispersant, if present at all, may be present in the composition in an amount of 0.05% by volume to 20% by volume based on total volume of the composition, such as 0.05% by volume to 10% by volume, such as 1% by volume to 10% by volume.

Additives

The composition may optionally comprise at least one additive. As used herein, an "additive" refers to a rheology modifier, a tackifier, a surface active agent, a flame retardant, a corrosion inhibitor, a UV stabilizer, a colorant, a tint, a solvent, a plasticizer, an adhesion promoter (other than the reactive diluent described above), an antioxidant, a defoamer, an oil, a rust inhibitor, a silane, a silane terminated polymer, a silyl terminated polymer, and/or a moisture scavenger.

Examples of suitable corrosion inhibitors include, for example, zinc phosphate-based corrosion inhibitors, for example, micronized Halox® SZP-391, Halox® 430 calcium phosphate, Halox® ZP zinc phosphate, Halox® SW-111 strontium phosphosilicate Halox® 720 mixed metal phosphor-carbonate, and Halox® 550 and 650 proprietary organic corrosion inhibitors commercially available from Halox. Other suitable corrosion inhibitors include Heucophos® ZPA zinc aluminum phosphate and Heucophos® ZMP zinc molybdenum phosphate, commercially available from Heucotech Ltd.

A corrosion inhibitor can comprise a lithium silicate such as lithium orthosilicate ($Li_4SiO_4$) and lithium metasilicate ($Li_2SiO_3$), MgO, an azole, or a combination of any of the foregoing. The corrosion inhibiting component may further comprise at least one of magnesium oxide (MgO) and an azole.

A corrosion inhibitor can comprise a monomeric amino acid, a dimeric amino acid, an oligomeric amino acid, or a combination of any of the foregoing. Examples of suitable amino acids include histidine, arginine, lysine, cysteine, cystine, tryptophan, methionine, phenylalanine, tyrosine, and combinations of any of the foregoing.

A corrosion inhibitor can comprise a nitrogen-containing heterocyclic compound. Examples of such compounds include azoles, oxazoles, thiazoles, thiazolines, imidazoles, diazoles, pyridines, indolizines, and triazines, tetrazoles, tolyltriazole, and combinations of any of the foregoing.

Examples of suitable triazoles include 1,2,3-triazole, 1,2,4-triazole, benzotriazole, derivatives thereof, and combinations of any of the foregoing. Derivatives of 1,2,3-triazole include 1-methyl-1,2,3-triazole, 1-phenyl-1,2,3-triazole, 4-methyl-2-phenyl-1,2,3-triazole, 1-benzyl-1,2,3-triazole, 4-hydroxy-1,2,3-triazole, 1-amino-1,2,3-triazole, 1-benzamido-4-methyl-1,2,3-triazole, 1-amino-4,5-diphenyl-1,2,3-triazole, 1,2,3-triazole aldehyde, 2-methyl-1,2,3-triazole-4-carboxylic acid, and 4-cyano-1,2,3-triazole, or combinations thereof. Derivatives of 1,2,4-triazole include 1-methyl-1,2,4-triazole, 1,3-diphenyl-1,2,4-triazole, 5-amino-3-methyl-1,2,4-triazole, 3-mercapto-1,2,4-triazole, 1,2,4-triazole-3-carboxylic acid, 1-phenyl-1,2,4-triazole-5-one, 1-phenylurazole, and combinations of any of the foregoing. Examples of diazoles include 2,5-dimercapto-1,3,4-thiadiazole.

A corrosion inhibitor can include an azole or combination of azoles. Azoles are 5-membered N-heterocyclic compounds that contain in the heterocyclic ring two double bonds, one to three carbon atoms and optionally a sulfur or oxygen atom. Examples of suitable azoles include benzotriazole, 5-methyl benzotriazole, tolyltriazole, 2,5-dimercapto-1,3,4-thiazole, 2-mercaptobenzothiazole, 2-mercaptobenzimidazole, 1-phenyl-5-mercaptotetrazole, 2-amino-5-mercapto-1,3,4-thiadiazole, 2-mercapto-1-methylimidazole, 2-amino-5-ethyl-1,3,4-thiadiazole, 2-amino-5-ethylthio-1,3,4-thiadiazole, 5-phenyltetrazole, 7H-imidazo(4,5-d)pyrimidine, and 2-amino thiazole. Salts of any of the foregoing, such as sodium and/or zinc salts, can also be used as effective corrosion inhibitors. Other suitable azoles include 2-hydroxybenzothiazole, benzothiazole, 1-phenyl-4-methylimidazole, and 1-(p-tolyl)-4-methlyimidazole.

Additives, if present at all, may be present in the composition in a total amount of no more than 30% by volume based on total volume of the composition, such as no more than 20% by volume, such as no more than 10% by volume, and may be present, if at all, in an amount of at least 0.01% by volume based on total volume of the composition, such as at least 0.02% by volume, such as at least 0.03% by volume. Additives, if present at all, may be present in the composition in an amount of 0.01% by volume to 30% by volume based on total volume of the composition, such as 0.02% by volume to 20% by volume, such as 0.03% by volume to 10% by volume.

Useful thixotropes that may be used include wax. As used herein, "wax" refers to an organic substance which is solid at ambient conditions and forms a liquid when heated. Waxes useful in the present invention are not particularly limited provided the wax has properties suitable for obtaining the hot melt adhesive of the present invention. Generally, the wax may have a weight-average molecular weight of less than 10,000. Examples of suitable waxes useful in the present invention include microcrystalline waxes, polyethylene waxes, Fischer-Tropsch waxes, paraffin waxes, Castor wax, polypropylene waxes, amide derivatives of the former, or combinations thereof.

Useful colorants or tints may include phthalocyanine blue and ultramarine blue.

Compositions provided by the present disclosure can comprise a flame retardant or combination of flame retardants. Certain TC materials described above such as aluminum hydroxide and magnesium hydroxide, for example, also may be flame retardants. As used herein, "flame retardant" refers to a material that slows down or stops the spread of fire or reduces its intensity. Flame retardants may be available as a powder that may be mixed with a composition, a foam, or a gel. In examples, when the compositions of the present invention include a flame retardant, such compositions may form a coating on a substrate surface and such coating may function as a flame retardant.

As set forth in more detail below, a flame retardant can include a mineral, an organic compound, an organohalogen compound, an organophosphorous compound, or a combination thereof.

Suitable examples of minerals include huntite, hydromagnesite, various hydrates, red phosphorous, boron compounds such as borates, carbonates such as calcium carbonate and magnesium carbonate, and combinations thereof.

Suitable examples of organohalogen compounds include organochlorines such as chlorendic acid derivatives and chlorinated paraffins; organobromines such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anyhydride, tetrabromobisphenol A (TBBPA) and hexabromocyclododecane (HBCD). Such halogenated flame retardants may be used in conjunction with a synergist to enhance their efficiency. Other suitable examples include antimony trioxide, antimony pentaoxide, and sodium antimonate.

Suitable examples of organophosphorous compounds include triphenyl phosphate (TPP), resorcinol bis(diphenylphosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate. In one important class of flame retardants, compounds contain both phosphorus and a halogen. Such compounds include tris(2,3-dibromopropyl) phosphate (brominated tris) and chlorinated organophosphates such as tris(1,3-dichloro-2-propyl)phosphate (chlorinated tris or TDCPP) and tetrakis(2-chlorethyl) dichloroisopentyldiphosphate (V6).

Suitable examples of organic compounds include carboxylic acid, dicarboxylic acid, melamine, and organonitrogen compounds.

Other suitable flame retardants include ammonium polyphosphate and barium sulfate.

Useful plasticizers that may be used include polymers, trimellitates, sebacates, esters, phthalates, citrates, adipates, benzoates, and the like. Non-limiting examples of such plasticizers include diisononylphthalate (Jayflex™ DINP available from Exxon Mobil), dioctylphthalate (Cereplas DOA™ available from Valtris), diisodecylphthalate (Jayflex™ DIDP available from Exxon Mobil), and alkyl benzyl phthalate (Santicizer 278 available from Valtris); benzoate-based plasticizers such as dipropylene glycol dibenzoate (K-Flex® available from Emerald Performance Materials); and other plasticizers including terephthalate-based dioctyl terephthalate (DEHT available from Eastman Chemical Company), alkylsulfonic acid ester of phenol (Mesamoll available from Borchers), epoxidized soybean oil (Plaschek 775 from Valtris), citric acid esters (Citroflex available from Morflex), phenylphophates (Santicizer 148 from Solutia), and 1,2-cyclohexane dicarboxylic acid diisononyl ester (Hexamoll DINCH available from BASF).

Stabilizers may be blended to prevent reduction of molecular weight by heating, gelation, coloration, generation of an odor and the like in the hot melt adhesive to improve the stability of the hot melt adhesive. Stabilizers that may be used in the present invention are not particularly limited. Examples of stabilizers useful in the present invention include an antioxidant, an ultraviolet absorbing agent, or combinations thereof. The stabilizer optionally may be lactone-based. The antioxidant may be used to prevent oxidative degradation of the composition of the present invention. Examples of the antioxidant include phenol-based antioxidants, sulfur-based antioxidants and phosphorus-based antioxidants. The ultraviolet absorbing agent may be used to improve the light resistance of the composition of the present invention. Examples of the ultraviolet absorbing agent include benzotriazole-based ultraviolet absorbing agents and benzophenone-based ultraviolet absorbing agents. Specific examples of suitable stabilizers include SUMILIZER GM (trade name), SUMILIZER TPD (trade name) and SUMILIZER TPS (trade name) manufactured by Sumitomo Chemical Co., Ltd., IRGANOX 1010 (trade name), IRGANOX HP2225FF (trade name), IRGAFOS 168 (trade name), IRGANOX 1520 (trade name) and TINUVIN P manufactured by Ciba Specialty Chemicals, JF77 (trade name) manufactured by Johoku Chemical Co., Ltd., TOMI-NOX TT (trade name) manufactured by API Corporation and AO-4125 (trade name) manufactured by ADEKA CORPORATION.

Oils useful in the present invention may include unsaturated renewable oils such as sunflower oil, safflower oil, soybean oil, linseed oil, castor oil, orange oil, rapeseed oil, tall oil, vegetable processing oil, vulcanized vegetable oil, high oleic acid sunflower oil, cottonseed oil, nut oils, and combinations thereof. Useful oils may include mineral oils such as Novadex B111 or Catenex T129 (available from Shell).

Optionally, the composition may comprise a solvent. As used herein, the term "solvent" refers to a molecule or a compound that has a high vapor pressure such as greater than 2 mm Hg at 25° C. and is used to lower the viscosity of a resin but that does not have a reactive functional group capable of reacting with a functional group(s) on molecules or compounds in a composition. Suitable solvents useful in the present invention include toluene, acetone, ethyl acetate, methyl ethyl ketone, xylene, and combinations thereof.

The solvent, if present at all, may be present in the composition in an amount of at least 1% by volume based on the total volume of the composition, such as at least 2% by volume, such as at least 5% by volume, and may be present in an amount of no more than 60% by volume based on total volume of the composition, such as no more than 40% by volume, such as no more than 20% by volume. The solvent, if present at all, may be present in the composition in an amount of 1% by volume to 60% by volume based on total volume of the composition, such as 2% by volume to 40% by volume, such as 5% by volume to 20% by volume.

Compositions

The composition according to the present invention may have a viscosity of at least 1 Pa·s at a shear rate of 10 s$^{-1}$ as measured by a MARS II rheometer at 80° C. using a cone plate with a diameter of 20 mm and an angle of 1°, such as at least 35 Pa·s, and may have a viscosity of no more than 750 Pa·s at a shear rate of 10 s$^{-1}$ as measured by a MARS II rheometer at 80° C. using a cone plate with a diameter of 20 mm and an angle of 1°, such as no more than 350 Pa·s. The composition according to the present invention may have a viscosity of 1 Pa·s to 750 Pa·s at a shear rate of 10 s$^{-1}$ as measured by a MARS II rheometer at 80° C. using a cone plate with a diameter of 20 mm and an angle of 1°, such as 35 Pa·s to 350 Pa·s.

The composition according to the present invention may have a viscosity of at least 25 Pa·s at a shear rate of 10 s$^{-1}$ as measured by a MARS II rheometer at 35° C. using a cone plate with a diameter of 20 mm and an angle of 1°, such as at least 50 Pa·s, and may have a viscosity of no more than 400 Pa·s at a shear rate of 10 s$^{-1}$ as measured by a MARS II rheometer at 35° C. using a cone plate with a diameter of 20 mm and an angle of 1°, such as no more than 115 Pa·s. The composition according to the present invention may have a viscosity of 25 Pa·s to 400 Pa·s at a shear rate of 10 s$^{-1}$ as measured by a MARS II rheometer at 35° C. using a cone plate with a diameter of 20 mm and an angle of 1°, such as 50 Pa·s to 115 Pa·s.

The composition according to the present invention may have a thermal conductivity of at least 0.5 W/m·K (measured according to ASTM D7984) with a TCi thermal conductivity analyzer from C-Therm Technologies Ltd., such as at least 1.0 W/m·K such as at least 1.5 W/m·K, and may have a thermal conductivity of no more than 4.0 W/m·K (measured according to ASTM D7984) with a TCi thermal conductivity analyzer from C-Therm Technologies Ltd., such as no more than 3.5 W/m·K. The composition according to the present invention may have a thermal conductivity of 0.5 W/m·K to 4.0 W/m·K (measured according to ASTM D7984) with a TCi thermal conductivity analyzer from C-Therm Technologies Ltd., such as 1.0 W/m·K to 4.0 W/m·K, such as 1.5 W/m·K to 3.5 W/m·K.

The composition according to the present invention may have a leakage current of no more than 0.5 mA/mm$^2$ (measured according to IEC 60243), such as no more than 0.15 mA/mm$^2$. The composition according to the present invention may have a leakage current of 0.03 mA/mm$^2$ to 0.5 mA/mm$^2$, such as 0.03 mA/mm$^2$ to 0.15 mA/mm$^2$.

The composition according to the present invention may have a Shore 00 hardness of at least 20 (measured according to ASTM D2240, immediate 0 sec, 23° C.).

The composition may have a total solids content of at least 40% by volume based on total volume of the composition, such as at least 65%, and may have a total solids content of no more than 100% by volume based on total volume of the composition, such as no more than 95% by volume. The composition may have a total solids content of 40% to 100% by volume based on total volume of the composition, such as 40% by volume to 95% by volume. As used herein, "total solids" refers to the non-volatile content of the composition, i.e., materials which will not volatilize when heated to 105° C. and standard atmospheric pressure (101325 Pa) for 60 minutes.

The composition may be substantially free, or essentially free, or completely free, of catalyst. As used herein, the term "catalyst" means a substance that increases the rate of chemical reaction without itself undergoing any permanent chemical change. As used herein with respect to the absence of catalyst in the thermoplastic polymer, "substantially free" means that catalyst is present, if at all, in an amount of less than 0.5% by volume based on total volume of the composition. As used herein with respect to the absence of catalyst in the thermoplastic polymer, "essentially free" means that catalyst is present, if at all, in an amount of less than 0.1% by volume based on total volume of the composition. As used herein with respect to the absence of polyester in the thermoplastic polymer, "completely free" means that catalyst is not present in the composition at all, i.e., there is 0.0% by volume catalyst based on total volume of the composition.

The composition may be a low-VOC composition. As used herein, the term "low-VOC" refers to a composition having a theoretical VOC volume % of less than 7% by volume, such as less than 3% by volume, such as less than 2% by volume, based on total volume of the composition. VOC may be measured according to ASTM D3960 (after hearing the volatile components for 1 hour at 110° C.±5° C.).

Methods and Systems

The present invention may also be a method for preparing a one-component composition comprising, or in some cases consisting of, or in some cases consisting essentially of, a thermoplastic polymer and a thermally conductive filler package, and any of the optional further components, if used, described above, the method comprising, or in some cases consisting essentially of, or in some cases consisting of, mixing the thermoplastic polymer and the thermally conductive filler package, and any of the optional further components. The components may be mixed together in any order. The resulting one-component composition may have a thermal conductivity of at least 0.5 W/m·K (measured according to ASTM D7984) and/or a leakage current of no more than 0.5 mA/mm² (measured according to IEC 60243). The composition described above may be applied alone or as part of a system that can be deposited in a number of different ways onto a number of different substrates. The system may comprise a number of the same or different films, coatings, or layers. A film, coating, or layer is typically formed when a composition is deposited onto at least a portion of the substrate surface through manual pressure, mechanical pressure, or extrusion.

The composition can be applied to the surface of a substrate in any number of different ways, non-limiting examples of which include brushes, rollers, films, pellets, trowels, spatulas, dips, spray guns and applicator guns to form a coating on at least a portion of the substrate surface. Alternatively, the composition may be casted, extruded, moulded, or machined to form a part or a member.

The present invention also is directed to a method for treating a substrate comprising, or consisting essentially of, or consisting of, contacting at least a portion of a surface of the substrate with one of the compositions of the present invention described hereinabove. The coating, layer or film, may be, for example, a sealant, a gap filler, or an adhesive.

The present invention is also directed to a method for forming a bond between two substrates for a wide variety of potential applications in which the bond between the substrates provides particular mechanical properties related to lap shear or peel strength. The method may comprise, or consist essentially of, or consist of, applying the composition described above to a first substrate; contacting a second substrate to the composition such that the composition is located between the first substrate and the second substrate; and applying sufficient pressure for the composition to intimately contact both substrates. For example, the composition may be applied to either one or both of the substrate materials being bonded to form an adhesive bond there between and the substrates may be aligned and pressure and/or spacers may be added to control bond thickness. The composition may be applied to cleaned or uncleaned (i.e., including oily or oiled) substrate surfaces.

As stated above, the composition of the present disclosure also may form a sealant on a substrate or a substrate surface. The sealant composition may be applied to substrate surfaces, including, by way of non-limiting example, a vehicle body or components of a vehicle or airplane, a battery, or a circuit board. The sealant formed by the composition of the present invention provides sufficient thermal conductivity and seals unwanted elements (i.e. dust, moisture, air) out of the substrate. The sealant composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat.

Substrates

The substrates that may be coated by the compositions of the present invention are not limited. Suitable substrates useful in the present invention include, but are not limited to, materials such as metals or metal alloys, polymeric materials such as hard plastics including filled and unfilled thermoplastic materials or thermoset materials, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. In examples, the substrate may be a multi-metal article. As used herein, the term "multi-metal article" refers to (1) an article that has at least one surface comprised of a first metal and at least one surface comprised of a second metal that is different from the first metal, (2) a first article that has at least one surface comprised of a first metal and a second article that has at least one surface comprised of a second metal that is different from the first metal, or (3) both (1) and (2). Suitable substrates for use in the present invention include those that are used in the assembly of vehicles, batteries, and electronics. For example, suitable substrates include without limitation vehicular battery, vehicular door, body panels, trunk deck lid, roof panel, hood, roof and/or stringers, rivets, landing gear components, and/or skins used on an aircraft), a vehicular frame, vehicular parts, motorcycles, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may be coated, such as with a primer or paint, such as an electrodeposited primer coating. The substrate may comprise a composite material such as a plastic or a fiberglass composite. The substrate may be a fiberglass and/or carbon fiber composite. The compositions of the present invention are particularly suitable for use in various industrial or transportation applications including automotive, light and heavy commercial vehicles, marine, or aerospace.

Three-Dimensional Printing

The composition of the present invention also may be used to produce articles, using three-dimensional printing. A three-dimensional article may be produced by forming successive portions or layers of an article by depositing a composition of the present invention onto a substrate and thereafter depositing additional portions or layers of the composition over the underlying deposited portion or layer and/or adjacent the previously deposited portion or layer. Layers can be successively deposited adjacent a previously deposited layer to build a printed article. A composition can be mixed and then deposited. By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The components of the composition may each be provided neat or may also include a solvent (organic and/or water) and/or other additives as described herein. The composition of the present invention can be deposited using any suitable equipment. The selection of suitable deposition equipment depends on a number of factors including the deposition volume, the viscosity of the composition and the complexity of the part being fabricated. The composition can be pushed under pressure or extruded through the nozzle. The composition may be injected or otherwise placed in a die caster or a mould to form a part or a member and optionally may be machined to a particular configuration.

Figure 2:
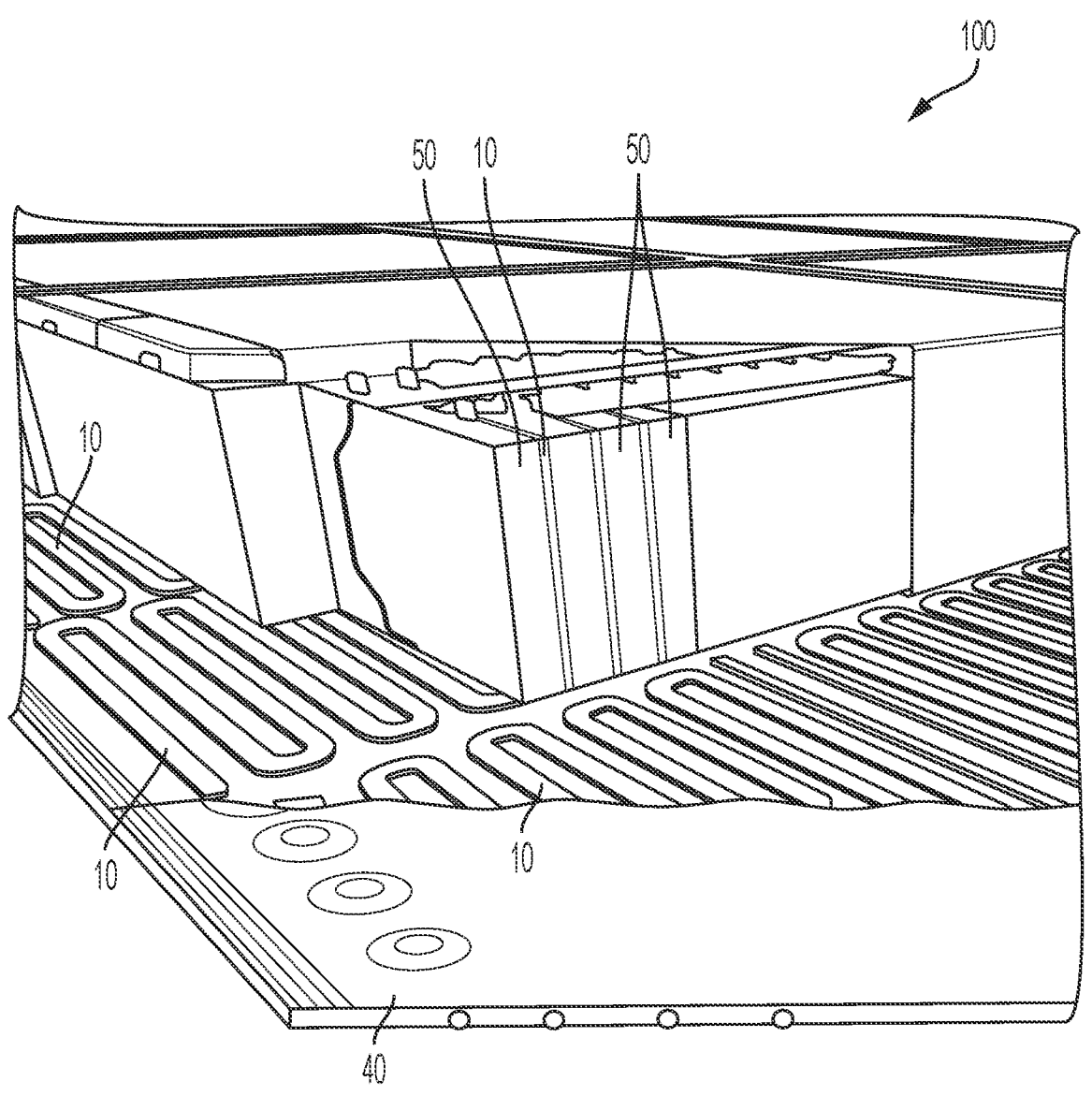

FIGS. 1 and 2 are schematic perspective views illustrating a thermally conductive member utilized as a gap filler in a battery pack 100. As illustrated in FIG. 1, the thermally conductive matter 10 (formed from the compositions described herein in an at least partially cured state) is positioned between two battery cells/battery modules 50 which are interconnected in series or in parallel by interconnects (not shown). In other examples (FIG. 1), the thermally conductive matter may be positioned between cooling fin 30 and/or a battery cell/battery module 50, between battery modules 50, between a battery cell/battery module 50 and a surface of a wall of a battery box 20 or may be applied as a coating on at least a portion of the substrate of a wall of a battery box 20. As shown in FIG. 2, the thermally conductive matter 10 may be positioned between a cooling plate 40 and a battery cell/battery module 50. The battery pack may further comprise a thermal management system (not shown) comprising air or fluid circuits, which may be liquid based (for example glycol solutions) or direct refrigerant based.

Coatings and Uses Thereof

According to the present invention, coatings, layers, films, and the like, and formed parts, are provided which, in an at least partially dried or cured state, surprisingly:

(a) have a thermal conductivity of at least 0.5 W/m·K (measured according to ASTM D7984), such as at least 1 W/m·K, such as at least 2 W/m·K;

(b) have a leakage current of less than 0.5 mA/mm$^2$ (measured according to IEC 60243);

(c) maintain a temperature of the substrate that is at least 100° C. lower following exposure of the coating on the surface of the substrate to 1000° C. for at a time of at least 90 seconds than a surface temperature of a bare substrate exposed to 1000° C. for the time;

(d) provide a substrate with thermal and fire protection;

(e) do not smoke upon exposure of the substrate to 1000° C. for 500 sec; and/or (f) exhibit no visible cracking or delamination upon exposure of the substrate to 1000° C. for 500 sec.

Such coatings and/or formed parts may be formed from the compositions of the present invention.

In examples, coatings and the like and parts formed from the compositions of the present invention surprisingly may, in an at least partially cured state, have a thermal conductivity of at least 0.5 W/m·K (measured according to ASTM D7984), maintain a temperature of the substrate that is at least 100° C. lower following exposure of the coating on the surface of the substrate to 1000° C. for at a time of at least 90 seconds than a surface temperature of a bare substrate exposed to 1000° C. for the time, provide a substrate with thermal and fire protection, not smoke upon exposure of the substrate to 1000° C. for 500 sec, and/or exhibit no visible cracking or delamination.

In examples, the compositions of the present invention surprisingly may be used for making a coating that, in at least partially cured state, have a thermal conductivity of at least 0.5 W/m·K (measured according to ASTM D7984), maintain a temperature of the substrate that is at least 100° C. lower following exposure of the coating on the surface of the substrate to 1000° C. for at a time of at least 90 seconds than a surface temperature of a bare substrate exposed to 1000° C. for the time, provide a substrate with thermal and fire protection, not smoke upon exposure of the substrate to 1000° C. for 500 sec, and/or exhibit no visible cracking or delamination.

Coatings and the like formed from compositions of the present invention may be used to provide a substrate with thermal and fire protection.

The coating compositions of the present invention may be used to make a coating having, in an at least partially cured state, a thermal conductivity of at least 0.5 W/m·K (measured according to ASTM D7984) and maintaining a temperature of the substrate that is at least 100° C. lower following exposure of the coating on the surface of the substrate to 1000° C. for at a time of at least 90 seconds than a surface temperature of a bare substrate exposed to 1000° C. for the time.

The coating compositions of the present invention also may be used to make a coating that, in an at least partially cured state, provides a substrate with thermal and fire protection.

The coating compositions of the present invention also may be used to make a coating that, in an at least partially cured state, may not smoke upon exposure of the substrate to 1000° C. for 500 sec.

The coating compositions of the present invention also may be used to make a coating that, in an at least partially cured state, exhibits no visible cracking or delamination.

Also disclosed are coatings that, in at least partially cured state, have a thermal conductivity of at least 0.5 W/m·K (measured according to ASTM D7984), maintain a temperature of the substrate that is at least 100° C. lower following exposure of the coating on the surface of the substrate to 1000° C. for at a time of at least 90 seconds than a surface temperature of a bare substrate exposed to 1000° C. for the time, provide a substrate with thermal and fire protection, not smoke upon exposure of the substrate to 1000° C. for 500 sec, and/or exhibit no visible cracking or delamination.

Coatings and the like formed from compositions of the present invention may be used to provide a substrate with thermal and fire protection.

As used herein, a "temperature of the substrate following exposure of the coating on the surface of the substrate to elevated temperatures such as 1000° C. for at a time" may be measured by applying a coating composition to a substrate surface and allowing such composition to cure (for example, for 2 days in an environmental chamber (50% RH, 25° C.) followed by 1 day at 140° F. (60° C.)). When the composition is at least partially cured, a thermocouple may be attached at a center point of the substrate to which the coating composition was applied to monitor the temperature through the coating. In order to determine the temperature at the back of the coated substrate, the center of the coated substrate may be positioned at a distance of 4 cm from a propane torch (diameter 3.5 cm, propane) with the coating in the direction of the torch. The temperature of the flame may be monitored through a second thermocouple placed close to the base of the flame.

As used herein, "thermal protection" of a substrate refers to a coating that has a thermal conductivity of at least 0.5 W/m·K (measured according to ASTM D7984).

As used herein, "fire protection" of a substrate refers to a coating that prevents a substrate from reaching its critical temperature, and "critical temperature" means approximately the temperature where the substrate has lost approximately 50% of its yield strength from that at room temperature.

As used herein, "cracking and delamination" refers to an interruption of a coating such that at least a portion of the substrate surface is exposed.

Aspects

In view of the foregoing the present invention thus relates inter alia, without being limited thereto, to the following aspects:

Aspect 1. A composition, comprising:
a thermoplastic polymer; and
a thermally conductive filler package comprising thermally conductive, electrically insulative filler particles having a thermal conductivity of at least 5 W/m·K (measured according to ASTM D7984) and a volume resistivity of at least 10 am (measured according to ASTM D257) and present in an amount of at least 50% by volume based on total volume of the filler package.

Aspect 2. The composition of Aspect 1, wherein the composition has a thermal conductivity of at least 0.5 W/m'K measured at 20° C. and a leakage current of less than 0.5 mA/mm² (measured according to IEC 60243).

Aspect 3. The composition of Aspect 1 or Aspect 2, wherein the thermoplastic polymer is present in an amount of 1% by volume to 80% by volume based on total volume of the composition.

Aspect 4. The composition of any of the preceding Aspects, wherein the thermoplastic polymer comprises polybutadiene, polyisobutylene, polybutene, or combinations thereof.

Aspect 5. The composition of any of the preceding Aspects, wherein the thermoplastic polymer is substantially free of reactive functional groups.

Aspect 6. The composition of any of the preceding Aspects, wherein the thermoplastic polymer comprises an elastomeric material.

Aspect 7. The composition of any of the preceding Aspects, wherein the thermoplastic polymer is substantially free of silicone.

Aspect 8. The composition of any of the preceding Aspects, wherein the filler package is present in an amount of 20% by volume to 99% by volume based on total volume of the composition.

Aspect 9. The composition of any of the preceding Aspects, wherein the filler package further comprises thermally conductive, electrically conductive filler particles having a thermal conductivity of at least 5 W/m'K (measured according to ASTM 7984) and a volume resistivity of less than 1 am (measured according to ASTM D257).

Aspect 10. The composition of Aspect 9, wherein the thermally conductive, electrically conductive filler particles are present in an amount of no more than 50% by volume based on total volume of the filler package.

Aspect 11. The composition of any of the preceding Aspects, wherein the filler package further comprises non-thermally conductive, electrically insulative filler particles having a thermal conductivity of less than 5 W/M·K (measured according to ASTM 7984) and a volume resistivity of at least 1 m (measured according to ASTM D257).

Aspect 12. The composition of Aspect 11, wherein the non-thermally conductive, electrically insulative filler particles are present in an amount of no more than 10% by volume based on total volume of the filler package.

Aspect 13. The composition of any of the preceding Aspects wherein at least one of the thermally conductive fillers of the filler package comprises a surface treated filler particle.

Aspect 14. The composition of any of the preceding Aspects, further comprising an additive.

Aspect 15. The composition of any of the preceding Aspects, wherein the composition has a viscosity of 1 Pa·s to 700 Pa·s at a shear rate of 10 s⁻¹ as measured by an MARS II rheometer at 80° C. using a cone plate with a diameter of 20 mm and an angle of 1°.

Aspect 16. The composition of any of the preceding Aspects, wherein the composition comprises a total solids content of 40% by volume to 100% by volume based on total weight of the composition.

Aspect 17. The composition of any of the preceding Aspects, further comprising a dispersant.

Aspect 18. The composition of Aspect 17, wherein the dispersant is present in an amount of 0.05% by volume to 20% by volume based on total volume of the composition.

Aspect 19. The composition of any of the preceding Aspects, wherein the coating composition comprises a gap filler composition, a sealant composition, a 3D printable composition, a putty, a molding compound, a potting compound, and/or an adhesive composition.

Aspect 20. The composition of any of the preceding Aspects, wherein the composition is a one-component composition.

Aspect 21. A coating, comprising a thermal conductivity of at least 0.5 W/m'K (measured according to ASTM D7984) and a leakage current of less than 0.5 mA/mm² (measured according to IEC 60243).

Aspect 22. The coating of Aspect 21, formed from the composition of any of Aspects 1 to 20.

Aspect 23. A coated substrate comprising a surface, at least a portion of which is coated with a coating formed by the composition of any of Aspects 1 to 20.

Aspect 24. The coated substrate of Aspect 23, wherein the coating has:

(a) a thermal conductivity of at least 0.5 W/m·K (measured according to ASTM D7984); and/or (b) a leakage current of less than 0.5 mA/mm² (measured according to IEC 60243).

such that the composition is located between the first substrate and the second substrate.

Aspect 31. A method of forming an article comprising extruding the composition of any of Aspects 1 to 20.

Aspect 32. The method of Aspect 31, wherein the extruding comprises three-dimensional printing.

Aspect 33. The article formed by the method of Aspect 31 or Aspect 32.

Illustrating the invention are the following examples, which, however, are not to be considered as limiting the invention to their details. Unless otherwise indicated, all parts and percentages in the following examples, as well as throughout the specification, are by volume.

EXAMPLES

TABLE 1

| Abbreviation description of materials used in Examples 1 to 6 | | | | |
|---|---|---|---|---|
| RAW MATERIAL | Commercial name | Supplier | D50 (μm)* | Molecular Weight (g/mol) |
| ATH (aluminum trihydrate) (TC/EI filler) | FRAT 44 | ALTEO (UNIVAR distributor) | 22 | — |
| Calcinated Alumina (TC/EI filler) | P122SB | ALTEO (UNIVAR distributor) | 2.2 | — |
| Aluminum trihydrate (TC/EI filler) | APYRAL 20X | Nabaltec | 8 | — |
| ZnO (TC/EI filler) | ZNO RAC | Bruggeman (Brenntag distributor) | 50 | — |
| MgO (spherical) (TC/EI filler) | DENKA - MgO | DENKA | 105 | — |
| Calcinated Kaolin (NTC/EI filler) | Polestar 200R | IMERIS (SMPC distributor) | — | — |
| Kaolin (NTC/EI) | Kaolin G3G | BASSERMANN | — | — |
| Polyisobutylene (thermoplastic polymer) | OPPANOL B10 | BASF | — | 40000 |
| Polyisobutylene (thermoplastic polymer) | OPPANOL B12 | BASF | — | 55000 |
| Polyisobutylene (thermoplastic polymer) | INDOPOL H100 | INEOS | — | 910 |
| Dioctyl adipate (DOA) | Cereplas DOA | valtris (CALDIC distributor) | — | — |
| Saturated oil (Additive) | novadex B111 | MULTISOL | — | — |
| Pigment (colorant) | EUROPHTAL BLUE 2103 | QUADRIMEX | — | — |
| Pigment (colorant) | Bleu Ultramarine | NUBIOLA | — | — |
| Dispersant | DRAPEX 39 | GALATA CHEMICALS | — | — |
| Dispersant | ANTI TERRA U100 | BYK | — | — |

*per supplier specification

Aspect 25. A battery assembly comprising the coating of Aspect 21 or Aspect 22 or the coated substrate of Aspect 23 or Aspect 24.

Aspect 26. A circuit board comprising the coating of Aspect 21 or Aspect 22 or the coated substrate of Aspect 23 or Aspect 24.

Aspect 27. A part comprising the coating of Aspect 21 or Aspect 22 or the coated substrate of Aspect 23 or Aspect 24.

Aspect 28. A substrate comprising the coating of Aspect 21 or Aspect 22 or the coated substrate of Aspect 23 or Aspect 24.

Aspect 29. A method of forming a coating on a substrate surface comprising applying the composition of any of Aspects 1-20 to a surface of a first substrate.

Aspect 30. The method of Aspect 29, further comprising contacting a surface of a second substrate to the composition

TABLE 2

| Thermal conductivity, viscosities, and leakage current of compositions of Examples 1 to 6 (vol %) | | | | | | |
|---|---|---|---|---|---|---|
| Composition | Ex 1 | Ex 2 | Ex 3 | Ex 4 | Ex 5 | Ex 6 |
| FRAT 44 | 53.55 | 55.47 | 58.12 | 56.34 | 71.44 | — |
| APYRAL 20X | — | — | — | — | — | 71.87 |
| P122SB | — | — | — | 10.48 | — | — |
| DENKA | — | 11.87 | — | — | — | — |
| Polestar 200R | 14.92 | — | — | — | — | — |
| ZNO RAC | — | — | 7.65 | — | — | — |
| Kaolin G3G | — | — | — | — | 2.33 | — |
| OPPANOL B10 | — | — | — | — | 10.09 | — |
| OPPANOL B12 | 10.63 | 11.01 | 11.54 | 11.18 | — | — |
| INDOPOL H100 | 3.27 | 3.39 | 3.55 | 3.44 | — | 14.78 |

TABLE 2-continued

Thermal conductivity, viscosities, and leakage current
of compositions of Examples 1 to 6 (vol %)

| Composition | Ex 1 | Ex 2 | Ex 3 | Ex 4 | Ex 5 | Ex 6 |
|---|---|---|---|---|---|---|
| CEREPLAS DOA | 11.76 | 12.18 | 12.76 | 12.37 | 5.45 | — |
| Novadex B111 | — | — | — | — | 5.87 | — |
| ANTI TERRA U100 | 5.87 | 6.08 | 6.37 | 6.18 | 4.79 | — |
| Bleu Ultramarine | — | — | — | — | — | 0.45 |
| Drapex 39 | — | — | — | — | — | 12.91 |
| EUROPHTAL BLUE 2103 | — | — | — | — | 0.03 | — |
| TC (W/mK) | 1.95 | 3 | 2.4 | 2.8 | 2.8 | 3.3 |
| Viscosity (Pa · s) @ 35° C. | 320.8 | 51.13 | 350.23 | 112.83 | 40.73 | 91.76 |
| Viscosity (Pa · s) @ 80° C. | 58.21 | 44.04 | 111.4 | 41.31 | 40 | 42.16 |
| Leakage Current (mA/mm²) | 0.21 | 0.09 | 0.05 | 0.24 | 0.09 | 0.04 |

The compositions of Examples 1-6 were prepared using the ingredients shown in Table 1 according to the following procedure with all non-manual mixing performed using a Z-blade mixer (Marc Guittard). For each example, all raw materials were put together and mixed at speed 50 tr/min for 20 minutes, and then mixed for an additional 20 minutes.

The compositions of Examples 1-6 were tested for thermal conductivity at room temperature using a Modified Transient Plane Source (MTPS) method (measured according to ASTM D7984) with a TCi thermal conductivity analyzer from C-Therm Technologies Ltd. The sample was manually transferred onto the sensor at ambient conditions. The sample size was at least 30 mm by 30 mm with a thickness of 20 mm. Data are reported in Table 2. As shown, each experimental sample had a thermal conductivity of at least 1.0 W/m·K.

Viscosity was measured using an MARS II rheometer at 35° C. or 80° C., using a mobile (20/1) with a diameter 20 mm and an angle 1°. The sample was compressed to a thickness of 0.3 mm. Excess material was removed prior to measuring viscosity. The gap was set to be 0.3 mm. Shear rate program was: (1) Linear ramp up 0-10/s in 120 s; (2) Hold speed at 10/s during 120 s; (3) Linear ramp down 10-0/s in 120 s. Data are reported in Table 2. As shown, viscosity of the experimental samples was 40 Pa·s at 80° C. to 120 Pa·s at 80° C.

Leakage current was measured according to IEC 60243 standard on a SEFELEC SXS56, Electrical safety tester 50 VA (Eaton) at room temperature. 3 g of sample was manually loaded in between the steel cover and the aluminum substrate. The sample was compressed to a thickness of 0.2 mm. The diameter of the sample (D) was measured by a steel ruler and the surface area (AR) of the sample was calculated using the equation $\pi(D/2)^2$. The applied voltage was 2.5 kV and the current of each sample (I) was recorded after the voltage was stabilized for 60 seconds. The leakage current was obtained by I(i)=FAR. Data are reported in Table 2. The leakage current of the samples were less than 0.5 mA/mm².

Fire protection test. For each example, part A and part B were prepared separately using a Speedmixer DAC 600FVZ (commercially available from FlackTek inc.). Equivalent mass amount of part A and part B were mixed using a Speedmixer DAC 600FVZ until the mixture appeared homogenous. The mixtures of Examples 3 and 4 were trowel-applied to steel panel structures at approximately 7.8 mm to 7.9 mm thick. The steel panel structure had a dimension of depth 3⁄16", length 7" and width 3".

After application, the coated structures were allowed to cure for 2 days in an environmental chamber (50% RH, 25° C.) followed by 1 day at 140° F. (60° C.), and final film thickness of coatings were measured and recorded before subjecting to fire tests.

Figure 3:
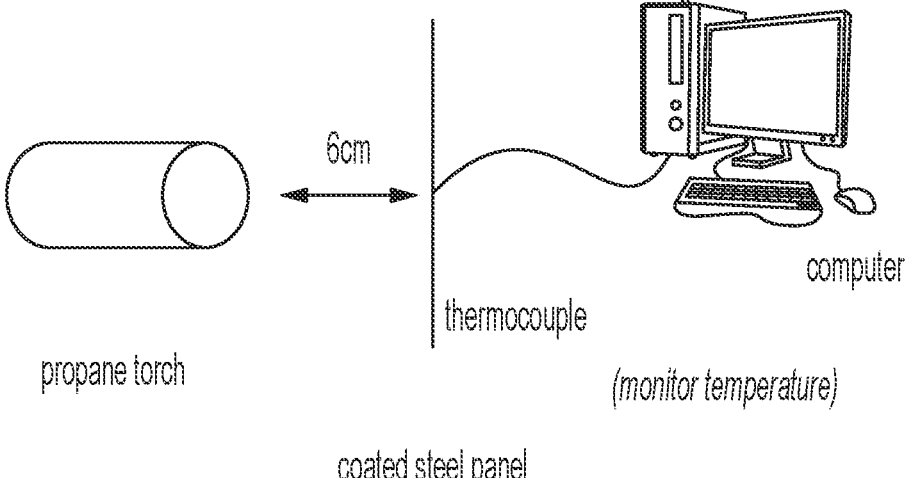
FIG. 3 is a schematic showing the setup used in the fire protection test of the Examples.
Figure 4:
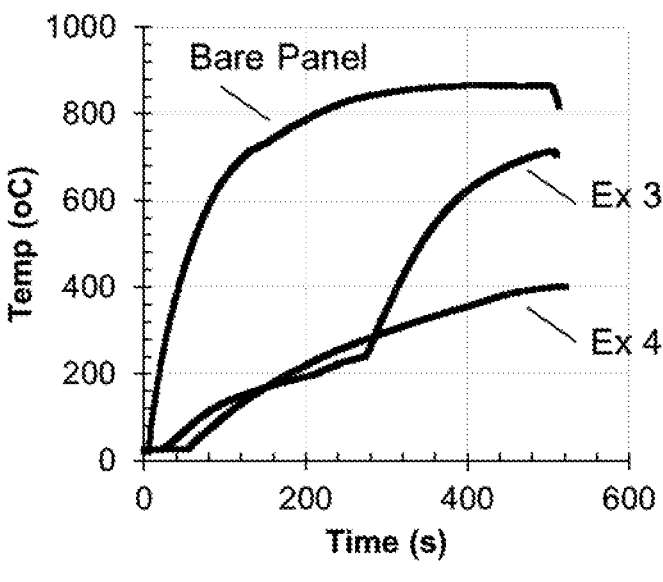
FIG. 4 is a graph illustrating the fire performance of a substrate having a coating formed from the compositions of Examples 3 and 4 compared to a bare (uncoated) substrate.

On the back of the coated panel, a thermocouple was attached at the center point to monitor the temperature through the sample. The center of the coated panel was then positioned at a distance of 4 cm from a propane torch (diameter 3.5 cm, propane) with the coating in the direction of the torch. The temperature of the flame was monitored through a second thermocouple placed close to the base of the flame and found to remain stable between 900° C. to 1000° C. See FIG. 3. The temperature at the back of the coated substrate and for comparison of an uncoated identical steel panel was measured for a prolonged period of time. Data are reported in FIG. 4.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

We claim:

1. A composition, comprising:
   a thermoplastic polymer;
   a thermally conductive filler package comprising thermally conductive, electrically insulative filler particles having a thermal conductivity of at least 5 W/m·K (measured according to ASTM D7984) and a volume resistivity of at least 10 Ω·m (measured according to ASTM D257) and present in an amount of at least 50% by volume based on total volume of the thermally conductive filler package; and
   a dispersant, different from the thermoplastic polymer, in an amount of 0.01% by volume to 20% by volume based on total volume of the composition;
   wherein the thermally conductive, electrically insulative filler particles comprise thermally stable filler particles,
   wherein the composition is substantially solvent-free, and
   wherein the composition has a viscosity of 1 Pa's to 750 Pa·s at a shear rate of 10·s⁻¹ as measured by a MARS II rheometer at 80° C. using a cone plate with a diameter of 20 mm and an angle of 1°.

2. The composition of claim 1, wherein the composition comprises the thermally stable filler particles in an amount of at least 90% by volume based on total volume of the thermally conductive, electrically insulative filler particles.

3. The composition of claim 1, wherein the composition comprises a thermal conductivity of at least 0.5 W/m·K (measured according to ASTM D7984) and a leakage current of less than 0.5 mA/mm² (measured according to IEC 60243), a viscosity of 1 Pa·s to 700 Pa·s at a shear rate of 10 s⁻¹ as measured by a rheometer at 80° C. using a cone plate with a diameter of 20 mm and an angle of 1° and/or a total solids content of 40% by volume to 100% by volume based on total volume of the composition.

4. The composition of claim 1, wherein the composition comprises the thermoplastic polymer in an amount of 1% by volume to 70% by volume based on total volume of the composition.

5. The composition of claim 1, wherein the thermoplastic polymer comprises an elastomeric material.

6. The composition of claim 1, wherein the thermoplastic polymer is substantially free of silicone.

7. The composition of claim 1, wherein the composition comprises the filler package in an amount of 30% by volume to 99% by volume based on total volume of the composition, further comprises thermally conductive, electrically conductive filler particles having a thermal conductivity of at least 5 W/m·K (measured according to ASTM 7984) and a volume resistivity of less than 1 Ω·m (measured according to ASTM D257) and/or further comprises non-thermally conductive, electrically insulative filler particles having a thermal conductivity of less than 5 W/m·K (measured according to ASTM 7984) and a volume resistivity of at least 1 Ω·m (measured according to ASTM D257).

8. The composition of claim 1, wherein the composition further comprises an additive.

9. The composition of claim 1, wherein the composition comprises a gap filler composition, a sealant composition, a 3D printable composition, a putty, a molding compound, a potting compound, and/or an adhesive composition.

10. A battery assembly comprising:

a battery cell; and a coating formed from the composition of claim 1 on a surface of the battery cell, wherein the coating, in an at least partially cured state, comprises a thermal conductivity of at least 0.5 W/m·K (measured according to ASTM D7984), comprises a leakage current of less than 0.5 mA/mm$^2$ (measured according to IEC 60243), maintains a temperature of the substrate that is at least 100° C. lower following exposure of the coating on the surface of the substrate to 1000° C. for a time of at least 90 seconds than a surface temperature of a bare sub-strate exposed to 1000° C. for the time, and/or does not smoke upon exposure of the substrate to 1000° C. for 500 seconds.

11. A substrate comprising a coating formed from the composition of claim 1.

12. The substrate of claim 11, wherein the coating, in an at least partially cured state, comprises a thermal conductivity of at least 0.5 W/m·K (measured according to ASTM D7984), comprises a leakage current of less than 0.5 mA/mm$^2$ (measured according to IEC 60243), maintains a temperature of the substrate that is at least 100° C. lower following exposure of the coating on the surface of the substrate to 1000° C. for a time of at least 90 seconds than a surface temperature of a bare substrate exposed to 1000° C. for the time, and/or does not smoke upon exposure of the substrate to 1000° C. for 500 seconds.

13. The substrate of claim 12, wherein the substrate comprises a vehicle, a part, an article, an appliance, a battery cell, a personal electronic device, a circuit board, a multi-metal article, or combinations thereof.

14. The substrate of claim 13, wherein the vehicle comprises an automobile or an aircraft and/or the part comprises a thermally conductive part.

15. A gap filler formed from the composition of claim 1.

16. A battery assembly comprising the thermal gap filler of claim 15.

17. A method of treating a substrate comprising:

contacting at least a portion of a surface of the substrate with the composition of claim 1.

18. A method of forming an article comprising extruding the composition of claim 1.

*    *    *    *    *